(12) United States Patent
Huang et al.

(10) Patent No.: US 10,909,937 B1
(45) Date of Patent: Feb. 2, 2021

(54) DRIVER CIRCUIT AND RELATED DISPLAY SYSTEM

(71) Applicant: NOVATEK Microelectronics Corp., Hsin-Chu (TW)

(72) Inventors: Hsien-Po Huang, Hsinchu (TW); Yen-Tao Liao, Hsinchu (TW); Hongchun Cong, Xi'an (CN)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 16/686,222

(22) Filed: Nov. 18, 2019

(51) Int. Cl.
*G09G 3/36* (2006.01)
*G09G 5/10* (2006.01)
*G02F 1/1362* (2006.01)

(52) U.S. Cl.
CPC ......... *G09G 3/3607* (2013.01); *G02F 1/1362* (2013.01); *G02F 2001/136222* (2013.01); *G09G 2310/027* (2013.01); *G09G 2320/0666* (2013.01); *G09G 2370/08* (2013.01)

(58) Field of Classification Search
CPC .. G09G 3/36; G09G 5/10; G09G 5/02; G09G 5/04; G09G 5/00; G06K 9/00
See application file for complete search history.

(56) References Cited

U.S. PATENT DOCUMENTS

| | | | |
|---|---|---|---|
| 2020/0013348 A1* | 1/2020 | Lee | G09G 3/3413 |
| 2020/0043412 A1* | 2/2020 | Zeng | G09G 3/3241 |
| 2020/0202801 A1* | 6/2020 | Lee | G09G 3/3685 |
| 2020/0227006 A1* | 7/2020 | Yao | G09G 5/06 |
| 2020/0279534 A1* | 9/2020 | Ji | G09G 3/3648 |

* cited by examiner

*Primary Examiner* — Pegeman Karimi
(74) *Attorney, Agent, or Firm* — Winston Hsu

(57) ABSTRACT

A driver circuit is coupled to a dual cell panel having a first cell and a second cell superposed on each other. The driver circuit includes a second cell processor and a first cell processor. The second cell processor is configured to generate a gray scale data for the second cell. The first cell processor includes a pixel data compensation circuit and a white tracking compensation circuit. The pixel data compensation circuit is configured to compensate an image data for the first cell according to a brightness of the image data. The white tracking compensation circuit is configured to compensate the image data for the first cell according to a color temperature of the gray scale data.

22 Claims, 5 Drawing Sheets

DRIVER CIRCUIT AND RELATED DISPLAY SYSTEM

BACKGROUND OF THE INVENTION

1. Field of the Invention

The present invention relates to a driver circuit and a display system, and more particularly, to a driver circuit and a display system for a liquid crystal display panel.

2. Description of the Prior Art

A liquid crystal display (LCD), which is a flat panel display having the advantages of low radiation, light weight and low power consumption, is widely used in various information technology (IT) products such as notebook computers, personal digital assistants (PDA), and mobile phones. The operating principle of LCD is to vary the arrangement of liquid crystal molecules in a liquid crystal layer by varying the voltage difference between two terminals of the liquid crystal layer. The transparency of the liquid crystal layer may change accordingly, which is further incorporated with the light source provided by a backlight module to display images.

People in the industry are making their best efforts to improve the image quality such as resolution and contrast. For example, a dual cell panel is applied to increase the image contrast. In the dual cell panel, in addition to the front cell for displaying the image, a back cell is included and superposed on the front cell, for performing finely backlight control in each pixel, in order to achieve high contrast.

However, in order to remain the penetration rate of the LCD panel, the back cell has no color information and the related gray scale data is of mono color. Due to the characteristics of liquid crystal, the color temperatures of different gray scale data are not uniform, which results in color shift in the image frame. This non-uniformity of color temperature and color shift may reduce the image quality. Thus, there is a need for improvement over the prior art.

SUMMARY OF THE INVENTION

It is therefore an objective of the present invention to provide a driver circuit and a display system capable of compensating the non-uniformity of color temperature in the dual cell panel.

An embodiment of the present invention discloses a driver circuit coupled to a dual cell panel having a first cell and a second cell superposed on each other. The driver circuit comprises a second cell processor and a first cell processor. The second cell processor is configured to generate a gray scale data for the second cell. The first cell processor comprises a pixel data compensation circuit and a white tracking compensation circuit. The pixel data compensation circuit is configured to compensate an image data for the first cell according to a brightness of the image data. The white tracking compensation circuit is configured to compensate the image data for the first cell according to a color temperature of the gray scale data.

Another embodiment of the present invention discloses a display system, which comprises a dual cell panel and a driver circuit. The dual cell panel has a first cell and a second cell superposed on each other. The driver circuit, coupled to the dual cell panel, comprises a second cell processor and a first cell processor. The second cell processor is configured to generate a gray scale data for the second cell. The first cell processor comprises a pixel data compensation circuit and a white tracking compensation circuit. The pixel data compensation circuit is configured to compensate an image data for the first cell according to a brightness of the image data. The white tracking compensation circuit is configured to compensate the image data for the first cell according to a color temperature of the gray scale data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
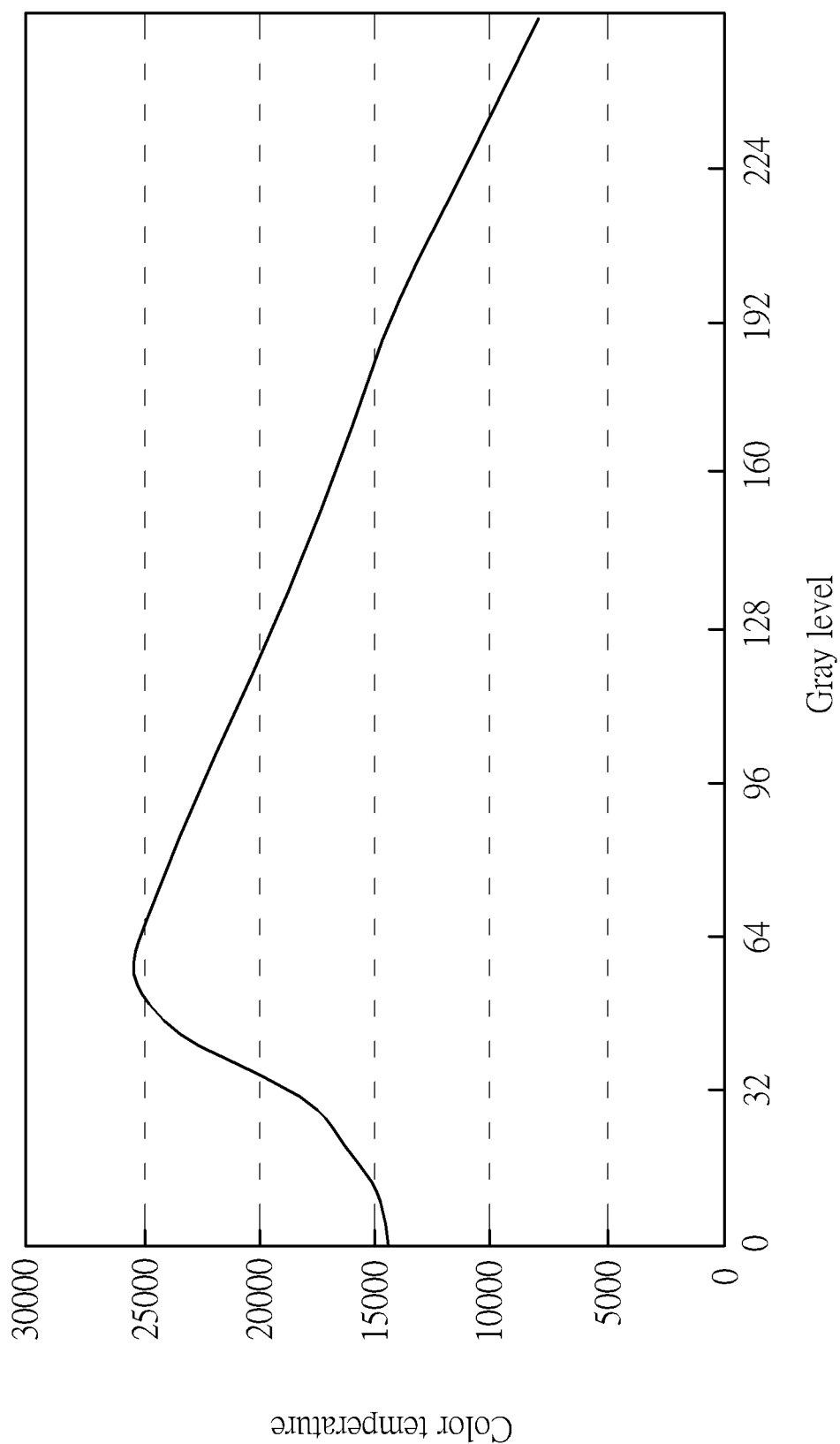
FIG. 1 illustrates the color temperature of the gray scale data for the back cell in a dual cell liquid crystal display panel.

Please refer to FIG. 1, which illustrates the color temperature of the gray scale data for the back cell in a dual cell liquid crystal display (LCD) panel. As shown in FIG. 1, the color temperature is higher between lower and medium gray levels, and the color temperature is lower with higher gray levels. This non-uniformity of color temperature causes that the image corresponding to lower gray levels tends to show cool colors (e.g., blue), such that the image quality may be reduced. Since the back cell merely aims at performing backlight control and does not have a color filter, this color shift may not be compensated in the back cell. Thus, it is required to compensate the color temperature in the front cell.

Figure 2:
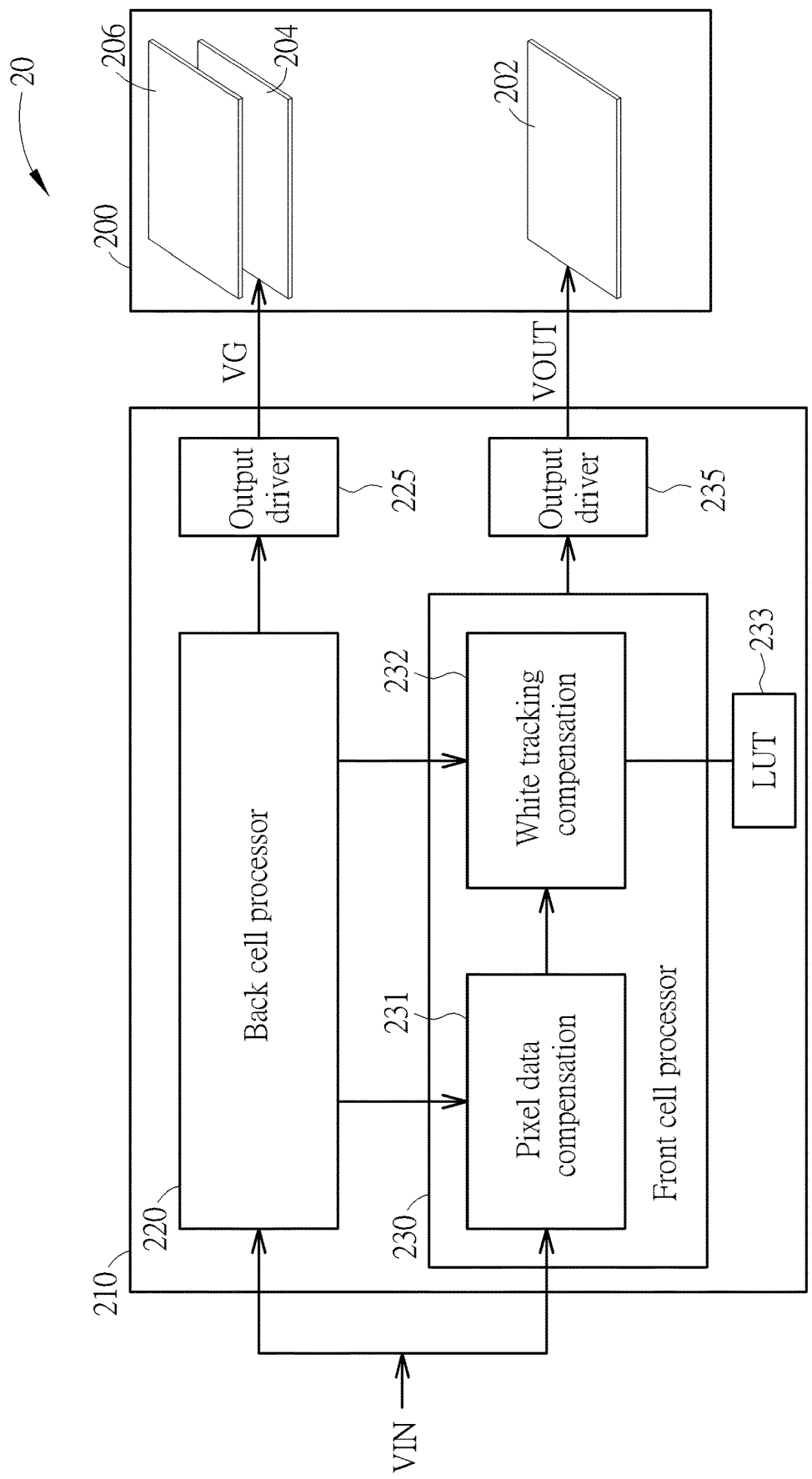
FIG. 2 is a schematic diagram of a display system according to an embodiment of the present invention.

Please refer to FIG. 2, which is a schematic diagram of a display system 20 according to an embodiment of the present invention. As shown in FIG. 2, the display system 20 includes a dual cell panel 200 and a driver circuit 210. The dual cell panel 200 may be an LCD panel, which includes a front cell 202, a back cell 204 and a backlight source 206. The front cell 202 is a color cell which includes a color filter for generating color information in each pixel/subpixel, in order to show a desired image. The back cell 204 is a mono cell which does not include a color filter. The back cell 204 is configured to control the backlight intensity in each pixel, and thus is not required to generate color information through the color filter. In the dual cell panel 200, the front cell 202 and the back cell 204 are superposed on each other. The backlight source 206 is configured to provide backlight for displaying images. The image displayed on the dual cell panel 200 is generated based on the light from the backlight source 206 and passing through the front cell 202 and the back cell 204.

Figure 3:
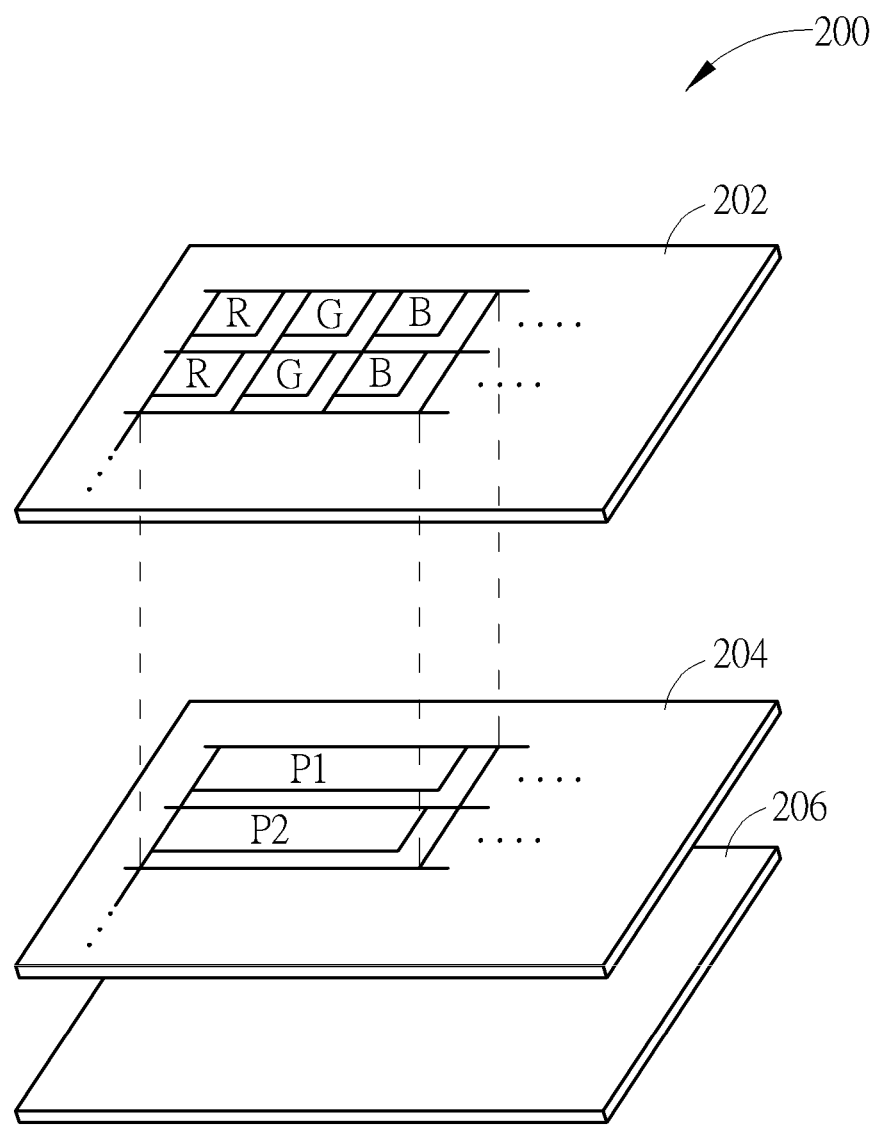
FIG. 3 is a schematic diagram of pixels of the front cell and the back cell.

In an embodiment, each pixel of the front cell 202 includes three subpixels having three primary colors, i.e., red (R), blue (B) and green (G), respectively, and each pixel of the front cell 202 is superposed on one pixel (e.g., P1, P2, etc.) of the back cell 204, as shown in FIG. 3. For example, in a 4k2k panel having the dual cell structure as the dual cell panel 200, there are 3840×2160 pixels in each of the front cell 202 and the back cell 204. The front cell 202 includes 3840×2160×3 subpixel units while the back cell 204 includes 3840×2160 pixel units or subpixel units.

Please continue to refer to FIG. 2. The driver circuit 210 includes a back cell processor 220, a front cell processor 230 and output drivers 225 and 235. The output driver 235 is configured to transmit output data VOUT converted from input image data VIN to the subpixels of the front cell 202 in a sequence, and each subpixel receives its data in a data cycle. Correspondingly, the output driver 225 is configured to transmit gray scale data VG to the corresponding pixel of the back cell 204 in the data cycle. The output drivers 225 and 235 may be implemented as source drivers for driving the data lines on the dual cell panel 200 to reach their target voltage levels. The back cell processor 220 is configured to generate the gray scale data VG to be transmitted to the back cell 204. The front cell processor 230 is configured to perform compensation on the input image data VIN to generate the output data VOUT for the front cell 202. In detail, the front cell processor 230 may include a pixel data compensation circuit 231 and a white tracking compensation circuit 232. The pixel data compensation circuit 231 is configured to compensate the input image data VIN according to the brightness of the input image data VIN. Note that in the dual cell structure, inclusion of the back cell 204 results in that the backlight intensity becomes 0 to 100 percent of original backlight intensity without the back cell 204, such that the backlight intensity of the entire panel may be reduced with the backlight control. Therefore, it is necessary to compensate the brightness of the display image through the pixel data compensation circuit 231, in order to remain the overall brightness of the image frame to its original level, while only the pixels having lower brightness become darker to enhance the contrast.

In addition, the white tracking compensation circuit 232 is configured to compensate the image data to be transmitted to the front cell 202 according to the color temperature of the gray scale data for the back cell 204, in order to compensate for the non-uniformity of color temperature. Since the back cell 204 only provides different degrees of backlight intensity but cannot provide color information, the compensation or adjustment for color temperature may not be performed on the back cell 204. Therefore, the present invention compensates for the non-uniformity of color temperature in the image data for the front cell 202 through the white tracking compensation circuit 232. In an embodiment, the driver circuit 210 may further include a lookup table (LUT) 233, which is coupled to the white tracking compensation circuit 232 and configured to store the output data VOUT corresponding to the input image data VIN, the gray scale data VG, and/or the color temperature information. In an embodiment, the back cell processor 220 and the front cell processor 230 may be implemented in a timing controller, for controlling and modifying the image data to achieve higher image quality.

As mentioned above, for the gray scale data VG to be transmitted to the back cell 204, the color temperature is higher between lower and medium gray levels, and the color temperature is lower with higher gray levels. Therefore, a smaller gray scale data may usually have a higher color temperature, such that the cool colors such as blue may become more obvious in the pixels having smaller gray scale data. In order to compensate for the non-uniformity of color temperature, preferably, the image data of red and green subpixels may be expanded and the image data of blue subpixels may be shrunk. More specifically, in the white tracking compensation circuit 232, the red image data may be compensated (expanded) to generate a larger red output data, the green image data may be compensated (expanded) to generate a larger green output data, and the blue image data may be compensated (shrunk) to generate a smaller blue output data. The expansion and shrinking degrees may be greater for lower gray scale data and less for higher gray scale data, so as to achieve the compensation for non-uniform color temperature. These output data may be obtained by referring to the LUT 233.

Figure 4:
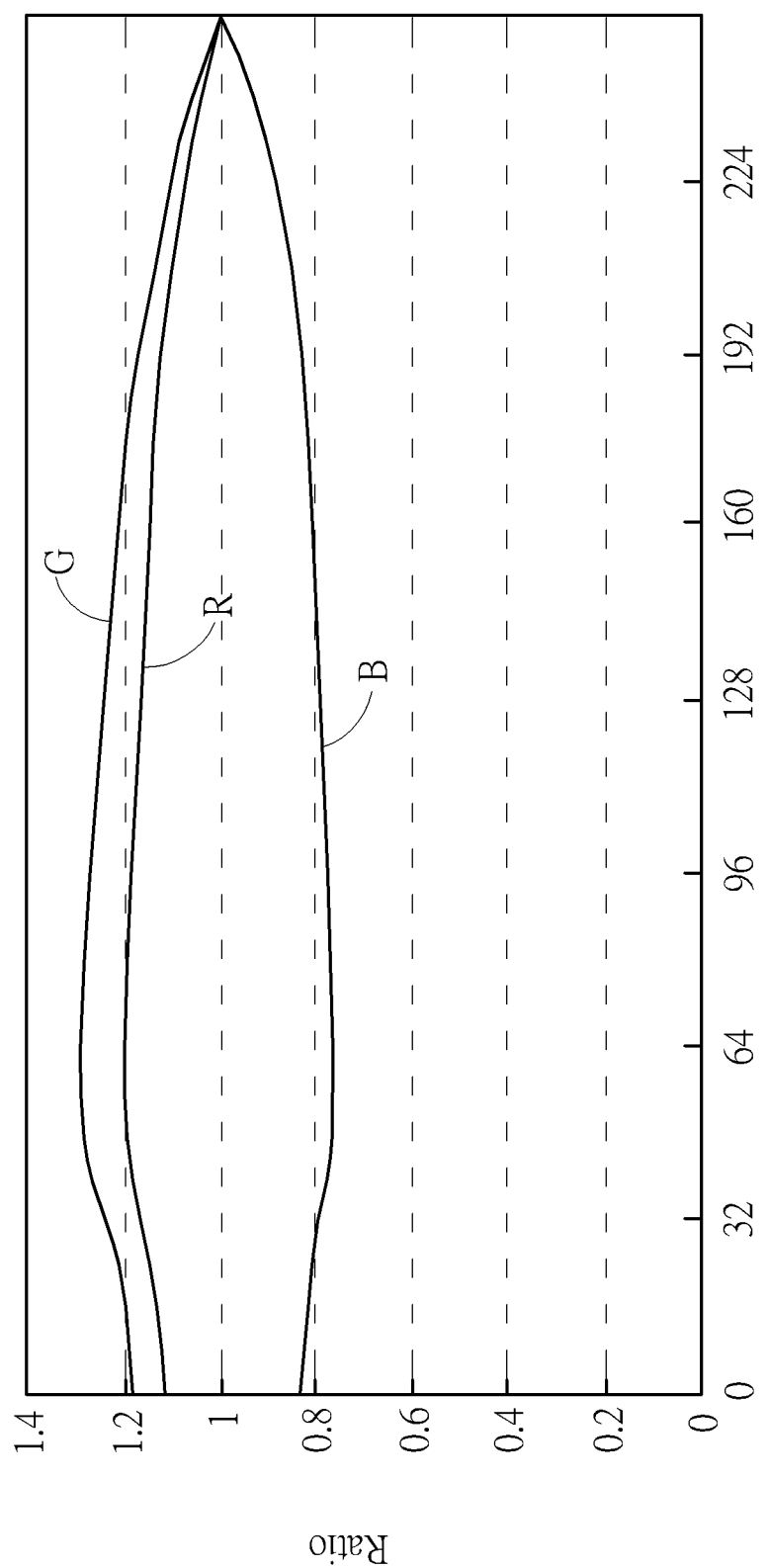
FIG. 4 is a schematic diagram of the compensation ratio based on the gray scale data for the back cell.

In an embodiment, the input image data VIN for the red, green and blue subpixels may be compensated through multiplication with a specific ratio according to the value of the gray scale data VG. Please refer to FIG. 4, which is a schematic diagram of the compensation ratio based on the gray scale data VG for the back cell 204. FIG. 4 illustrates the compensation ratios for red (R), green (G), and blue (B) subpixels under different gray scale data VG from 0 to 255 (taking 8-bit data in this example). The red image data, green image data and blue image data may be multiplied by the red compensation ratio, green compensation ratio and blue compensation ratio, respectively, to generate the red output data, green output data and blue output data, wherein these compensation ratios are determined according to the gray scale data VG. As shown in FIG. 4, the red and green compensation ratios are usually greater than 1, which leads to the expansion of red and green image data; the blue compensation ratio is usually smaller than 1, which leads to the shrinking of blue image data.

Figure 5:
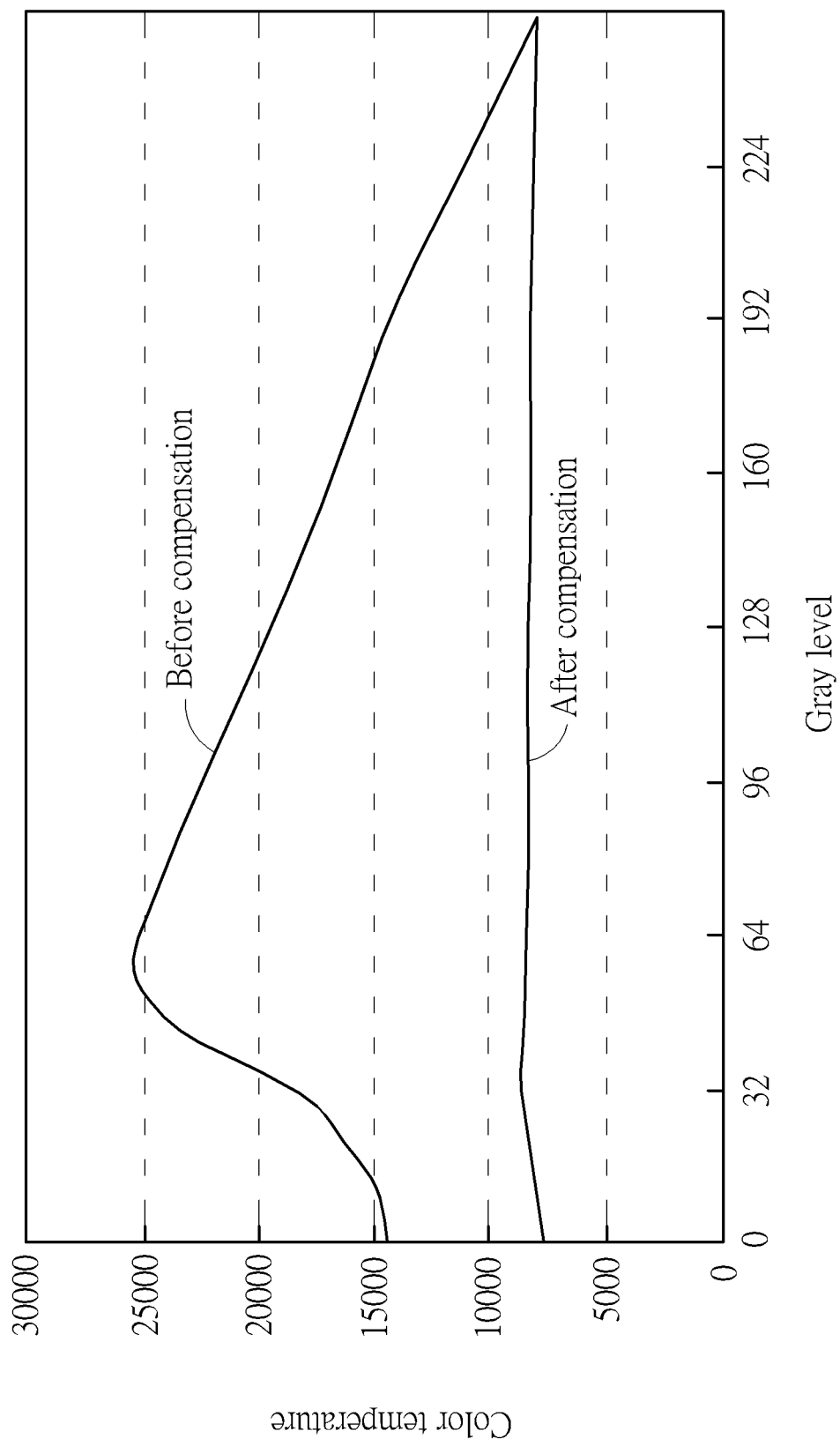
FIG. 5 illustrates the color temperature corresponding to the gray scale data for the back cell before and after compensation.

For example, if the gray scale data VG is equal to 64, the red compensation ratio and the green compensation ratio are approximately equal to 1.2 and 1.3, respectively, and the blue compensation ratio is approximately equal to 0.75, as shown in FIG. 4. These compensation ratios may be mapped to the gray scale data VG and stored in the LUT 233, or may be converted into corresponding output data to be stored in the LUT 233. As shown in FIG. 4 and FIG. 1, the red, green and blue compensation ratios are configured based on the color temperature of the gray scale data VG. FIG. 5 illustrates the color temperature corresponding to the gray scale data VG for the back cell 204 before and after compensation. As shown in FIG. 5, the compensation scheme allows the color temperature to become more uniform, which leads to higher image quality.

Please note that the present invention aims at providing a driver circuit applicable to a dual cell LCD panel for compensating the non-uniformity of color temperature in the dual cell LCD panel. Those skilled in the art may make modifications and alternations accordingly. For example, the embodiments of the present invention are applicable to any panel having the dual cell structure, which is not limited to the LCD panel. In addition, the compensation method of using compensation ratios described above is merely an exemplary embodiment, and those skilled in the art should understand that other compensation scheme may also be feasible. For example, the compensation of color temperature may be achieved by only decreasing the image data for blue subpixels without adjusting other image data, or achieved by increasing the image data for red and/or green subpixels without adjusting the image data for blue subpixels.

In an embodiment, the white tracking compensation circuit 232 may compensate the input image data VIN for the front cell 202 according to the color temperature of the gray scale data VG for the back cell 204 and also according to the value of the input image data VIN. An example of compensating the input image data VIN according to the value of the input image data VIN is illustrated in Table 1, as shown below.

TABLE 1

| VIN | R | G | B |
|---|---|---|---|
| 0 | 0 | 0 | 0 |
| 16 | 18.08 | 19.21 | 13.1 |
| 32 | 37.11 | 39.69 | 25.41 |
| 48 | 57.3 | 61.77 | 36.89 |
| 64 | 76.6 | 82.63 | 49.05 |
| 80 | 95.35 | 102.54 | 61.66 |
| 96 | 113.75 | 121.86 | 74.55 |
| 112 | 131.81 | 140.64 | 87.74 |
| 128 | 149.6 | 158.92 | 101.21 |
| 144 | 167 | 176.63 | 115.03 |
| 160 | 183.95 | 193.69 | 129.29 |
| 176 | 200.37 | 209.87 | 144.15 |
| 192 | 216.06 | 225.01 | 159.81 |
| 208 | 229.69 | 237.17 | 177.82 |
| 224 | 241.54 | 247 | 198.34 |
| 240 | 250.72 | 253.59 | 223.22 |
| 255 | 255 | 255 | 255 |

As shown in Table 1, the output image data VOUT for red (R), green (G) and blue (B) subpixels are obtained from the corresponding input image data VIN. For example, if an input image data VIN for a blue subpixel is 48, the output image data VOUT may be 36.89, which means that the blue image data is decreased. According to Table 1, the red and green image data are expanded and the blue image data are shrunk, so as to compensate the non-uniformity of color temperature as mentioned above. In an embodiment, the content of Table 1 may be stored in the LUT 233.

In another embodiment, the white tracking compensation circuit 232 may compensate the input image data VIN for the front cell 202 according to the color temperature of the gray scale data VG for the back cell 204 and also according to the value of the input image data VIN and the value of the gray scale data VG. An example of compensating the input image data VIN in this manner is illustrated in Tables 2-1 to 2-3, as shown below.

TABLE 2-1

| Red output data VOUT | Red image data VIN | | | | |
|---|---|---|---|---|---|
|  | 0 | 16 | 32 | 48 | ... |
| Gray scale data VG | 0 | 0 | 0 | 0 | 0 | ... |
| | 16 | 19.88 | 19.52 | 19.16 | 19.02 | ... |
| | 32 | 40.82 | 40.07 | 39.33 | 39.03 | ... |
| | 48 | 63.03 | 61.88 | 60.73 | 60.27 | ... |
| | ... | ... | ... | ... | ... | ... |

TABLE 2-2

| Green output data VOUT | Green image data VIN | | | | |
|---|---|---|---|---|---|
|  | 0 | 16 | 32 | 48 | ... |
| Gray scale data VG | 0 | 0 | 0 | 0 | 0 | ... |
| | 16 | 21.13 | 20.74 | 20.36 | 20.2 | ... |
| | 32 | 43.65 | 42.86 | 42.07 | 41.75 | ... |
| | 48 | 67.94 | 66.71 | 65.47 | 64.98 | ... |
| | ... | ... | ... | ... | ... | ... |

TABLE 2-3

| Blue output data VOUT | Blue image data VIN | | | | |
|---|---|---|---|---|---|
|  | 0 | 16 | 32 | 48 | ... |
| Gray scale data VG | 0 | 0 | 0 | 0 | 0 | ... |
| | 16 | 14.41 | 14.14 | 13.88 | 13.78 | ... |
| | 32 | 27.95 | 27.44 | 26.93 | 26.73 | ... |
| | 48 | 40.57 | 39.84 | 39.1 | 38.8 | ... |
| | ... | ... | ... | ... | ... | ... |

In this embodiment as shown in Tables 2-1 to 2-3, the image data for red, green and blue subpixels apply different tables, and only several image data mapping are shown in Tables 2-1 to 2-3 for brevity. Taking a red subpixel as an example, if the gray scale data VG is equal to 16 and the image data VIN is equal to 16, the white tracking compensation circuit 232 may refer to Table 2-1 to find that the output image data VOUT is 19.52. Similarly, according to Tables 2-1 to 2-3, the red and green image data are expanded and the blue image data are shrunk, so as to compensate the non-uniformity of color temperature as mentioned above. In an embodiment, the content of Tables 2-1 to 2-3 may be stored in the LUT 233.

To sum up, the present invention provides a driver circuit applicable to a dual cell panel for compensating the non-uniformity of color temperature in the dual cell panel. Since the back cell only provides different degrees of backlight intensity but cannot provide color information, the compensation or adjustment for color temperature may not be performed on the back cell. Therefore, the compensation for the non-uniformity of color temperature is applied to the image data for the front cell, where the white tracking compensation circuit in the front cell processor may perform the compensation by referring to an LUT. In an embodiment, the image data for the red, green and blue subpixels may be compensated through multiplication with a specific ratio according to the value of the gray scale data. In another embodiment, the image data for the red, green and blue subpixels may be compensated according to the value of the image data. Alternatively, the image data for the red, green and blue subpixels may be compensated by considering both the values of the image data and the gray scale data. According to the embodiments of the present invention, the non-uniformity of color temperature in the dual cell panel may be well compensated, so as to achieve a higher image quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driver circuit, coupled to a dual cell panel having a first cell and a second cell superposed on each other, the driver circuit comprising:
   a second cell processor, configured to generate a gray scale data for the second cell; and
   a first cell processor, comprising:
      a pixel data compensation circuit, configured to compensate an image data for the first cell according to a brightness of the image data; and
      a white tracking compensation circuit, configured to compensate the image data for the first cell according to a color temperature of the gray scale data.

2. The driver circuit of claim 1, wherein the first cell is a color cell comprising a color filter, and the second cell is a mono cell without the color filter.

3. The driver circuit of claim 1, further comprising:
a first output driver, coupled between the first cell and the first cell processor, configured to transmit an output data generated from the image data to the first cell; and
a second output driver, coupled between the second cell and the second cell processor, configured to transmit the gray scale data to the second cell.

4. The driver circuit of claim 1, further comprising:
a lookup table, coupled to the white tracking compensation circuit, configured to store an output data corresponding to at least one of the image data, the gray scale data and the color temperature.

5. The driver circuit of claim 4, wherein the white tracking compensation circuit receives a red image data, a green image data, and a blue image data to generate a red output data, a green output data, and a blue output data, respectively, by referring to the lookup table.

6. The driver circuit of claim 1, wherein the white tracking compensation circuit is configured to compensate the image data for the first cell according to the color temperature and a value of the gray scale data.

7. The driver circuit of claim 1, wherein the white tracking compensation circuit is configured to compensate the image data for the first cell according to the color temperature and a value of the image data.

8. The driver circuit of claim 1, wherein in the white tracking compensation circuit, a red image data is compensated to generate a red output data larger than the red image data, a green image data is compensated to generate a green output data larger than the green image data, and a blue image data is compensated to generate a blue output data smaller than the blue image data.

9. The driver circuit of claim 8, wherein the red image data, the green image data, and the blue image data are multiplied by a red compensation ratio, a green compensation ratio, and a blue compensation ratio, respectively, to generate the red output data, the green output data, and the blue output data.

10. The driver circuit of claim 9, wherein the red compensation ratio, the green compensation ratio, and the blue compensation ratio are determined according to the gray scale data.

11. The driver circuit of claim 9, wherein the red compensation ratio and the green compensation ratio are greater than 1, and the blue compensation ratio is smaller than 1.

12. A display system, comprising:
a dual cell panel, having a first cell and a second cell superposed on each other; and
a driver circuit, coupled to the dual cell panel, the driver circuit comprising:
a second cell processor, configured to generate a gray scale data for the second cell; and
a first cell processor, comprising:
a pixel data compensation circuit, configured to compensate an image data for the first cell according to a brightness of the image data; and
a white tracking compensation circuit, configured to compensate the image data for the first cell according to a color temperature of the gray scale data.

13. The display system of claim 12, wherein the first cell is a color cell comprising a color filter, and the second cell is a mono cell without the color filter.

14. The display system of claim 12, wherein the driver circuit further comprises:
a first output driver, coupled between the first cell and the first cell processor, configured to transmit an output data generated from the image data to the first cell; and
a second output driver, coupled between the second cell and the second cell processor, configured to transmit the gray scale data to the second cell.

15. The display system of claim 12, wherein the driver circuit further comprises:
a lookup table, coupled to the white tracking compensation circuit, configured to store an output data corresponding to at least one of the image data, the gray scale data and the color temperature.

16. The display system of claim 15, wherein the white tracking compensation circuit receives a red image data, a green image data, and a blue image data to generate a red output data, a green output data, and a blue output data, respectively, by referring to the lookup table.

17. The display system of claim 12, wherein the white tracking compensation circuit is configured to compensate the image data for the first cell according to the color temperature and a value of the gray scale data.

18. The display system of claim 12, wherein the white tracking compensation circuit is configured to compensate the image data for the first cell according to the color temperature and a value of the image data.

19. The display system of claim 12, wherein in the white tracking compensation circuit, a red image data is compensated to generate a red output data larger than the red image data, a green image data is compensated to generate a green output data larger than the green image data, and a blue image data is compensated to generate a blue output data smaller than the blue image data.

20. The display system of claim 19, wherein the red image data, the green image data, and the blue image data are multiplied by a red compensation ratio, a green compensation ratio, and a blue compensation ratio, respectively, to generate the red output data, the green output data, and the blue output data.

21. The display system of claim 20, wherein the red compensation ratio, the green compensation ratio, and the blue compensation ratio are determined according to the gray scale data.

22. The display system of claim 20, wherein the red compensation ratio and the green compensation ratio are greater than 1, and the blue compensation ratio is smaller than 1.

* * * * *